Jan. 27, 1970  G. E. GARD  3,492,011
LAMINATED GASKET CONSTRUCTION

Filed Aug. 30, 1966  4 Sheets-Sheet 1

INVENTOR
GEORGE E. GARD
BY Howson & Howson
ATTYS

Jan. 27, 1970  G. E. GARD  3,492,011
LAMINATED GASKET CONSTRUCTION
Filed Aug. 30, 1966  4 Sheets-Sheet 2
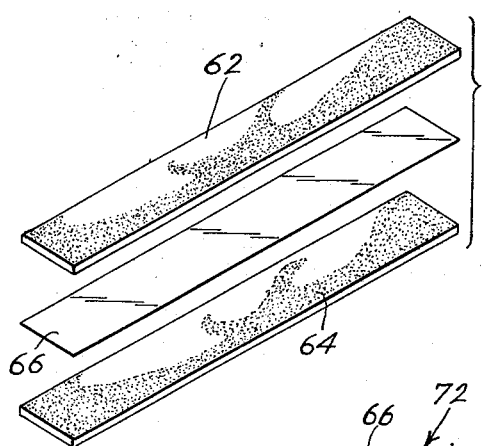
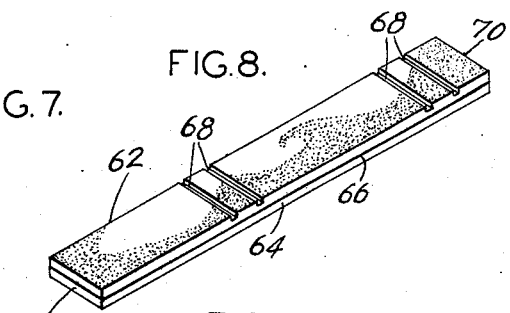
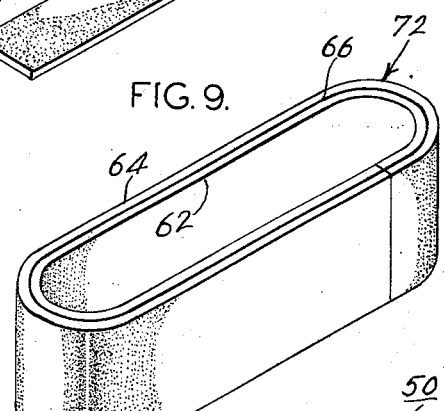
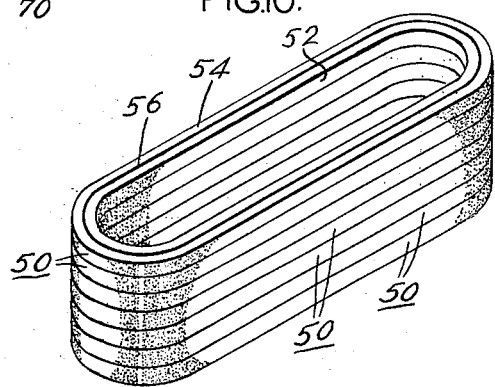
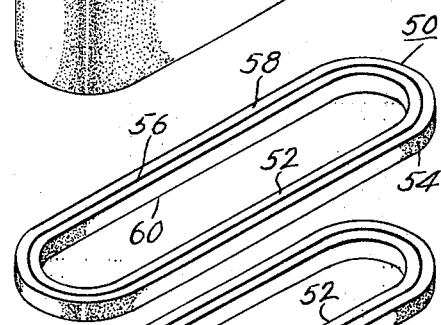
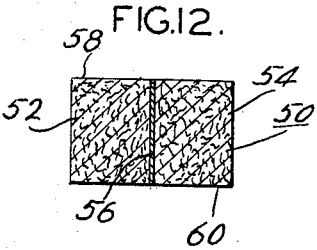
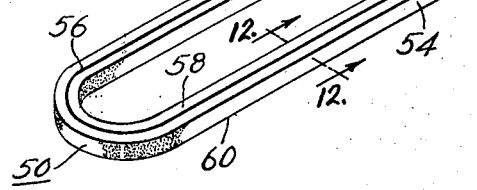
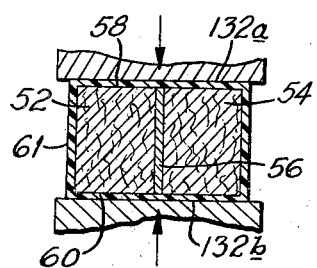
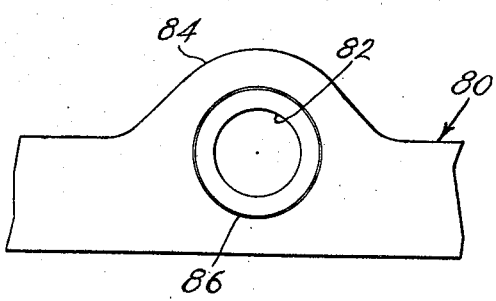
INVENTOR.
GEORGE E. GARD
BY Howson & Howson
ATTYS.

Jan. 27, 1970  G. E. GARD  3,492,011
LAMINATED GASKET CONSTRUCTION
Filed Aug. 30, 1966  4 Sheets-Sheet 3
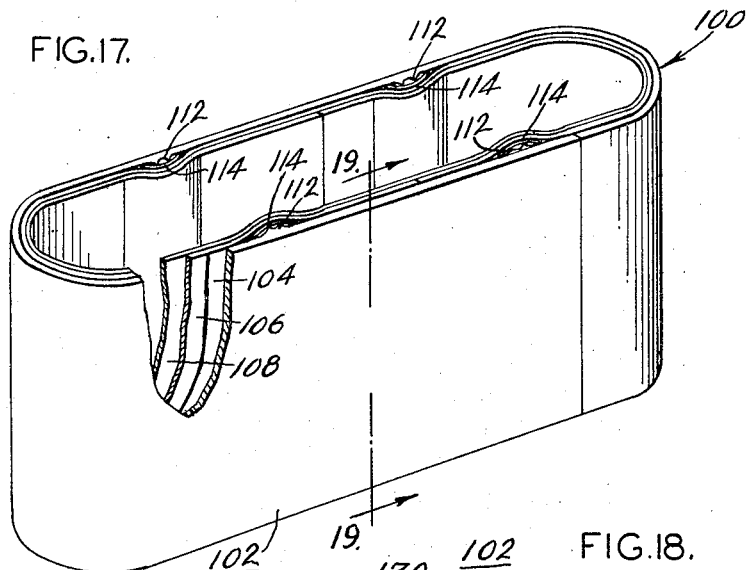
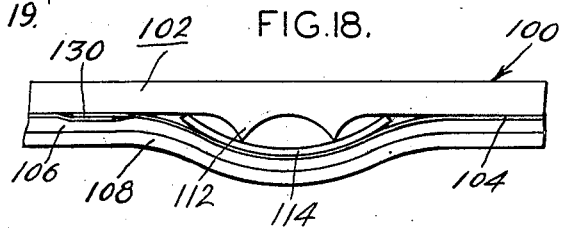
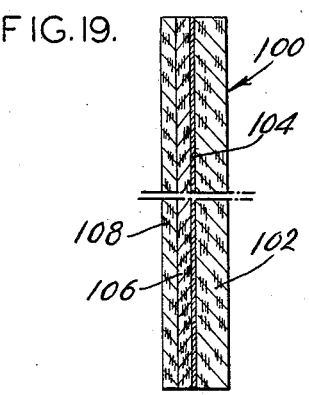
INVENTOR:
GEORGE E. GARD
BY Howson & Howson
ATTYS Jan. 27, 1970     G. E. GARD     3,492,011
LAMINATED GASKET CONSTRUCTION
Filed Aug. 30, 1966     4 Sheets-Sheet 4
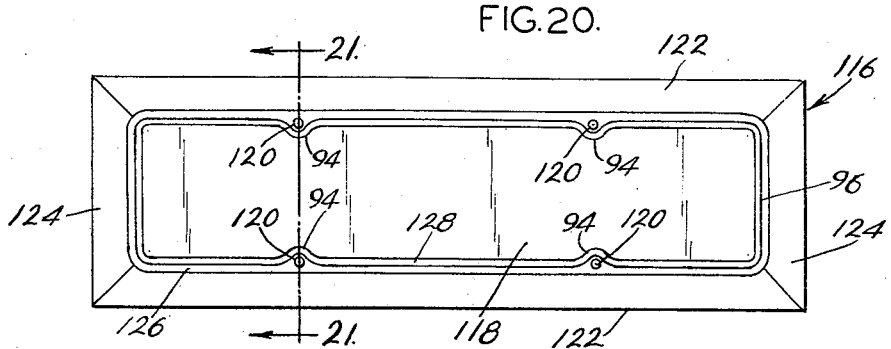
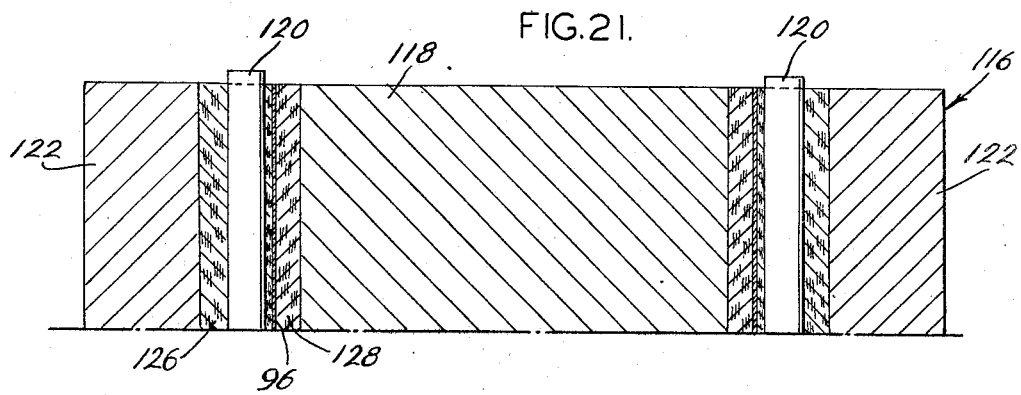
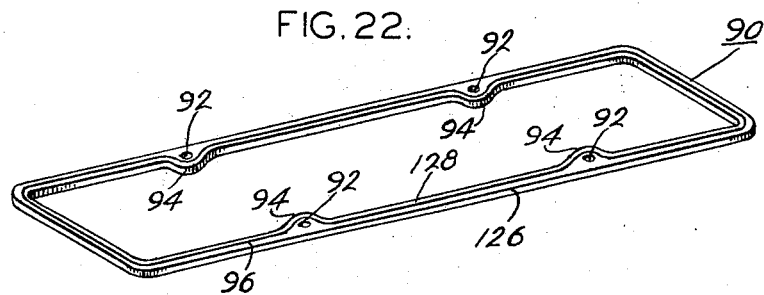
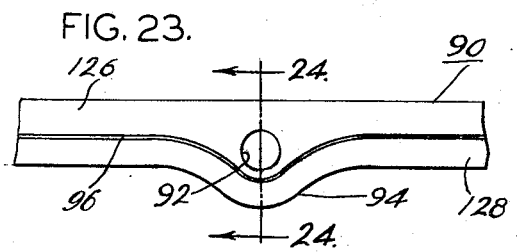
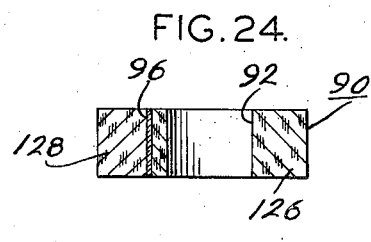
INVENTOR:
GEORGE E. GARD
BY Howson & Howson
ATTYS.

United States Patent Office 3,492,011
Patented Jan. 27, 1970

3,492,011
LAMINATED GASKET CONSTRUCTION
George E. Gard, Lancaster, Pa., assignor to Armstrong Cork Company, Lancaster, Pa., a corporation of Pennsylvania
Filed Aug. 30, 1966, Ser. No. 576,017
Int. Cl. F16j 15/00
U.S. Cl. 277—235                2 Claims

ABSTRACT OF THE DISCLOSURE

A laminated gasket characterized by inner and outer resilient portions of cork composition, each having a substantially rectangular cross-section, and a continuous metal foil reinforcing element adhesively bonded between the resilient portions and extending perpendicularly to the parallel sealing surfaces thereof. A coating such as neoprene is applied to at least the sealing surfaces of the gasket and in conjunction with the foil reinforcing element provides improved strength, dimensional stability, and sealing characteristics.

---

The present invention relates generally to resilient gaskets such as those made of cork composition and relates more particularly to a novel gasket construction providing improved dimensional stability and sealing characteristics. The invention further relates to a novel method of making resilient gaskets which permits a more efficient utilization of materials than conventional production methods.

Resilient gaskets are conventionally made from a cork composition comprising granulated cork of suitable particle size mixed with a binder and molded under heat and pressure. In one method of producing gaskets, thin sheets of cork composition of the desired gasket thickness are prepared from which the gaskets are stamped or cut. In making large gaskets, for example those used to seal automobile engine valve covers, a major proportion of the sheets is left over as scrap material. Although smaller gaskets can be made from some of the scrap portions, there is nonetheless a substantial amount of waste material remaining.

In an effort to improve the percentage of utilized material, "framed" or "skeletonized" sheets are currently used from which the large gaskets are die cut. Although the utilization efficiency is increased by the use of such sheets, there still remains a significant amount of scrap material. The present invention provides a method of producing resilient gaskets characterized by a material utilization which is at least twice as efficient as that obtainable with conventional methods.

In addition to production difficulties, the poor dimensional stability of conventional cork composition gaskets and the marginal sealing qualities of such gaskets are problems for which solutions have been long awaited. The conventional gaskets are subject to dimensional changes due to varying temperature and humidity conditions which not infrequently make them unsuitable for installation. Conventional gaskets in addition often have insufficient strength in critical areas such as those surrounding bolt holes and are subject to blow out failure in these areas.

It is accordingly a primary object of the present invention to provide a novel resilient gasket construction having improved strength, dimensional stability and sealing characteristics over conventional gaskets.

A further object of the invention is to provide a process for the production of resilient gaskets having exceptional material utilization efficiency and which is particularly adapted to the manufacture of the present improved gasket construction.

Additional objects and advantages of the present invention will be more readily apparent from the following detailed description of embodiments thereof when taken together with the accompanying drawings in which:

FIG. 7 is a perspective exploded view showing resilient cork composition sheets and an intermediate foil sheet from which an improved gasket embodying the present invention can be constructed by use of the present method;

FIG. 8 is a perspective view showing the laminated sheets of FIG. 7 following the grooving of one of the sheets to facilitate bending of the assembly;

FIG. 9 is a perspective view showing a sleeve molded from the sheet assembly of FIG. 8;

FIG. 10 is a perspective view showing the sleeve of FIG. 9 following the splitting thereof into a plurality of gaskets;

FIG. 11 is a view showing the appearance of two of the separated gaskets obtained from the splitting of the sleeve of FIG. 9;

FIG. 12 is a sectional view taken along line 12—12 of FIG. 11 showing the manner in which the reinforcing element extends between the opposed sealing surfaces of the gasket;

FIG. 12a is a sectional view of a gasket similar to that shown in FIG. 12 but having a neoprene coating on all four surfaces, the gasket being disposed between schematically illustrated parallel clamping surfaces;

FIG. 13 is a partial plan view showing the manner in which a modified form of the present gasket construction can be used to reinforce a bolt hole passing through a gasket;

FIG. 14 is a side edge view of a resilient gasket sheet showing the application of blocks thereto for the production of enlarged bolt hole areas in the molded gasket sleeve;

FIG. 15 is a view similar to FIG. 14 showing the blocks following a shaping step;

FIG. 16 is a view similar to FIG. 15 showing the positioning of cover strips over the shaped bolt hole blocks;

FIG. 17 is a perspective view showing the sleeve assembly prior to the molding operation, the assembly being broken away to show the arrangement of the several sheets thereof;

FIG. 18 is a partial plan view of the sleeve assembly of FIG. 17 showing the manner of assembly of the various elements in a bolt hole region;

FIG. 19 is a sectional view taken along line 19—19 of FIG. 17;

FIG. 20 is a plan view showing the sleeve assembly of FIG. 17 in a mold at the completion of the molding operation;

FIG. 21 is a sectional view taken along line 21—21 of FIG. 20 showing the manner in which the bolt holes are formed in the molded sleeve;

FIG. 22 is a perspective view of a gasket cut from a sleeve made in accordance with the process illustrated in FIGS. 14–21;

FIG. 23 is a partial plan view of a bolt hole region of the gasket of FIG. 22 showing the disposition of the reinforcing element in the vicinity of the bolt hole; and FIG. 24 is a sectional view taken along line 24—24 of FIG. 23.

Figure 1:
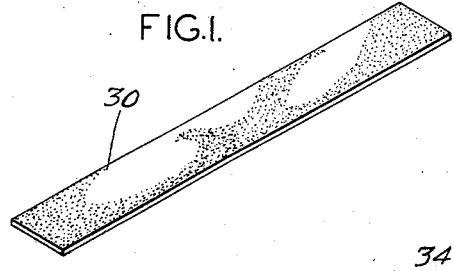
FIG. 1 is a perspective view showing a sheet of resilient material from which a plurality of gaskets may be made in accordance with the process of the present invention.
Figure 2:
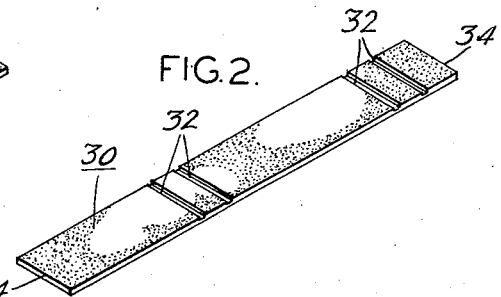
FIG. 2 is a view similar to FIG. 1 showing the sheet following a grooving operation to permit bending of the sheet into a loop without breaking.

Referring to the drawings, the present method of making resilient gaskets, in this instance of the conventional non-reinformed type, is schematically illustrated in FIGS. 1–6. An elongated flat rectangular sheet 30 of cork composition or similar resilient material as shown in FIG. 1 is provided with transverse grooves 32 in one surface thereof as shown in FIG. 2 to permit the bending of the sheet. The sheet 30, which should be of a thickness equal to the width of the finished gasket, is bent into a loop and the end edges 34 thereof are glued together by means of a suitable adhesive.

Figure 3:
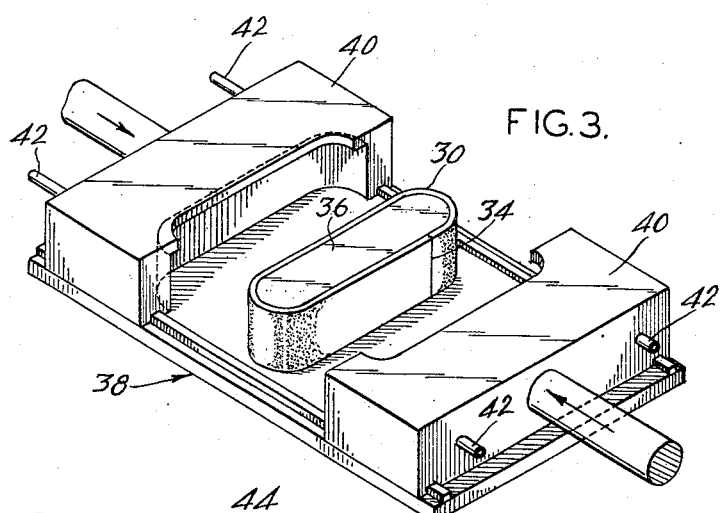
FIG. 3 is a perspective view showing the looped sheet of FIGS. 1 and 2 in a mold prior to the molding thereof into a sleeve.
Figure 4:
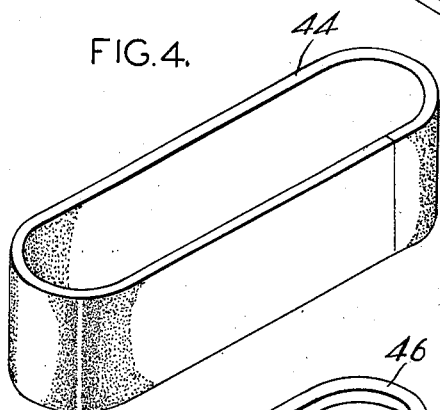
FIG. 4 is a perspective view of the molded sleeve following removal from the mold.
Figure 5:
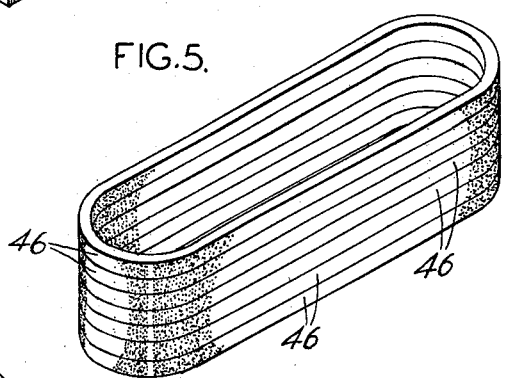
FIG. 5 is a perspective view of the plurality of gaskets formed from the split sleeve.
Figure 6:
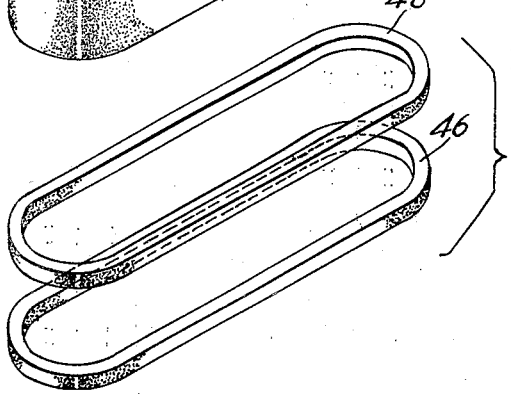
FIG. 6 is a perspective view showing a pair of gaskets cut from the sleeve.

The looped sheet is placed over the center core 36 of a mold 38 as shown in FIG. 3 and the opposed slidable mold sections 40 are closed thereon. Heat is applied to the mold sections through steam conduits 42 to provide a simultaneous application of heat and pressure to stress-relieve the curved area of the sheet. The core 36 is sized and shaped to the exact internal gasket dimensions, and the molded sheet on removal from the mold as shown in FIG. 4 constitutes a sleeve 44 having the sectional size and shape of the desired gaskets. The sleeve 44 is then cut transversely into a plurality of gaskets 46 as shown in FIGS. 5 and 6.

The only scrap material left over in this gasket making process is the sawdust resulting from the grooving of the sheet and the slicing of the sleeve, assuming that the sheet width is chosen to permit even division of the sleeve. The initial length of the strip 30 can be slightly longer than the circumference of the mold core 36 to permit placement of the looped sheet around the core. The cork composition, up subjection to heat and pressure in the mold, is accurately and permanently sized to the mold dimensions, the slots 32 being eliminated by the realignment of the granular cork particles.

The novel process described above provides an economical method of making conventional resilient gaskets in view of the almost complete utilization of materials afforded by this method. As pointed out above, however, a gasket of cork composition or other similar particulate material bonded together to form a resilient composition is not dimensionally stable and is subject to leakage due to its inherent lack of strength and porosity.

A novel reinforced gasket construction has been developed which essentially eliminates these drawbacks of conventional gaskets. The improved gasket 50 of the present invention, as shown in FIGS. 11 and 12, comprises inner and outer resilient portions 52 and 54 of rectangular cross-section between which is secured a thin non-elastic non-porous flexible reinforcing element 56 which extends between the opposed parallel sealing surfaces 58 and 60 of the gasket. The reinforcing element is preferably a thin foil such as aluminum foil or other suitable metallic foil.

Upon compression of the gasket, the reinforcing element folds in an accordion fashion but does not rupture and hence establishes a leak proof barrier between the sealing surfaces of the gasket. The reinforcing element in addition adds substantially to the strength of the gasket and provides a greatly improved dimensional stability. If desired, more than one reinforcing element may be employed with a correspondingly increased number of sheets of resilient material.

The above described laminated gasket construction is well suited for production by the novel process of the present invention described above and the steps of such a process are schematically outlined in FIGS. 7–10. As shown in FIGS. 7 and 8, inner and outer resilient sheets 62 and 64 are juxtaposed with an intermediate reinforcing sheet 66 of aluminum foil or similar material, the combined thicknesses of the sheets equalling the desired width of the finished gasket. The sheets are joined in laminar relation with a suitable adhesive between each sheet and are then subjected to the successive process stages described with respect to FIGS. 1–6.

As shown in FIG. 8, grooves 68 are cut in the sheet 62 to facilitate bending of the assembly into a loop to permit the glueing together of the end edges 70. The loop thus formed is placed in a mold wherein heat and pressure are applied to produce the sleeve 72 shown in FIG. 9. The sleeve 72 is then sliced transversely as shown in FIG. 10 to produce the finished gaskets 50 described above. By dimensioning the sheets 62, 64 and 66 to the proper width, considering the thickness of the gaskets desired and the material lost in sawing the sleeve into the individual gaskets, the sleeve may be cut to produce a predetermined number of gaskets with only the sawdust of the cutting and grooving remaining as scrap.

FIG. 13 illustrates one of many forms that the reinforcing element may take in a gasket construction. In this figure, a portion of a gasket 80 is illustrated within which a bolt hole 82 extends through an enlarged portion 84 of the gasket. To add additional strength to the gasket in this region and to prevent leakage into the bolt hole, an annular reinforcing element 86 of metal foil or similar material is provided within the gasket spaced concentrically around the bolt hole. The construction of FIG. 13 could be used in a gasket of the type shown in FIGS. 11 and 12, having in addition a continuous reinforcing element extending around the entire circumference of the gasket.

In FIGS. 14–24 is illustrated a form of reinforced gasket having a plurality of bolt holes therein and a method of producing such a gasket. A gasket 90 of this embodiment is shown in FIGS. 22–24 and is similar to the reinforced gasket of FIGS. 11 and 12 but includes a plurality of bolt holes 92 extending therethrough. As is conventional in gasket construction, the gasket is widened in ear-shaped portions 94 to accommodate the bolt holes. As shown most clearly in FIG. 23, the reinforcing element 96 curves around the bolt hole toward the interior of the gasket and is spaced from the hole to prevent damage to the element during installation of the gasket.

To form such a gasket utilizing the basic concept of the method described above, a laminated sleeve assembly 100 as shown most clearly in FIGS. 17–19 is formed of a relatively thick outer resilient sheet 102, a thin reinforcing sheet 104 which may be of aluminum foil or similar material, a relatively thin intermediate resilient sheet 106, and an inner resilient sheet 108 of a thickness similar to that of sheet 106. The outer sheet 102 as shown in FIGS. 14–16 is provided with spaced blocks 110 located at the points at which the bolt holes of the gasket will eventually be located, the blocks 110 being glued to the inner surface of the sheet 102. The blocks 110 which extend across the full width of the sheet, are then shaped into the modified M shape shown in FIG. 15 at 112. Spacing strips 114 of thin resilient material, as schematically shown in FIG. 16, are disposed over the M shaped projections 112 during assembly of the sheet elements.

The sheets 102, 106 and 108 are formed individually into loops with the ends thereof glued together as in the above described processes. The looped sheets and spacing strips 114 are then combined in the manner shown in FIG. 17 to form the sleeve assembly 100, a suitable adhesive being applied between the respective sheets and the spacing strips. The sleeve assembly 100 is then placed in a mold 116 as schematically illustrated in FIG. 20, the sleeve assembly being slid over the mold core 118 which is dimensioned to the exact size of the interior of the desired gasket. Teflon coated rods 120 are then inserted in the grooves of the M shaped configurations 112 between the configurations and the spacer strips 114. The outer elements 122 and 124 of the mold are then closed, and heat and pressure are applied to the assembly to cure the adhesive connecting the laminated assembly and to realign the particulate elements of the resilient sheets into the desired gasket configuration. Upon opening of the mold and removal of the rods 120, the molded sleeve is transversely sliced to provide a plurality of gaskets of the type 90 illustrated in FIGS. 22–24.

As shown in FIGS. 23 and 24, due to the heat and pressure of the molding step, the sheets 106 and 108 become molded into a homogeneous sheet and the spacer strips 114 similarly become blended into the M shaped configurations 112 on the sheet 102 so that the gasket appears to be formed of only three elements. The molded gasket thus comprises an outer resilient portion 126, an inner resilient portion 128 and a reinforcing layer 96 extending vertically therebetween. The spacing of the reinforcing element 96 interiorly of the bolt holes not only prevents installation damage to the reinforcing layer but in addition prevents leakage into the bolt hole region. The reinforcing layer thus both strengthens and seals the bolt holes in addition to maintaining a dimensional stability of the gasket which is of critical importance in the bolt hole designs.

It can be understood that by method steps similar to those shown in FIGS. 14–18, various other gasket details other than bolt holes may be provided in the finished gasket by adding appropriate projections or reliefs to one or more of the sheets utilized in forming the sleeve assembly. For example, the concentrically reinforced bolt hole arrangement shown in FIG. 13 could be made using the present process by utilizing an appropriate composite sleeve structure in conjunction with a suitably shaped mold.

By using two or more thinner sheets in place of a single thick sheet in forming the sleeve assembly, as used for example in the embodiment of FIG. 18, wherein relatively thin sheets 106 and 108 are substituted for a single thicker sheet, relatively sharp bends may be made without grooving the sheets in the manner shown in FIGS. 2 and 8.

Although the resilient sheets forming the sleeve assemblies are looped and butted end to end, the reinforcing element should be of sufficient length to permit overlapping of the ends as shown for example at 130 in FIG. 18. Adhesive is applied between the overlapped ends to insure a tight seal.

Other materials which might suitably be used as a reinforcing element include lead foil, copper foil, tin foil, and various synthetic films such as Mylar. The thickness of the reinforcing element has in tests ranged from .0005″ to .010″. The most satisfactory reinforcing element material is aluminum foil of less than about .004″, preferably about .001″ thickness in view of its low cost, handleability, softness when compressed on end, dimensional stability, imperviousness to oil and water, and its relatively good bondability to cork. Epoxy coated aluminum foil has proved particularly suitable for bonding to cork compositions.

Epoxy adhesive has been found to be most satisfactory for joining the resilient sheets and reinforcing elements especially in view of its cured flexibility, resistance to oil, water and acids, and its suitability for bonding metal foils to cork composition.

The temperature and time required for curing the adhesive and stress-relieving the cork sleeve in the mold depend on a number of factors including the properties of the adhesive and the cork composition. A curing temperature of 250°–300° F., would be normally anticipated and the curing time required might typically range from 30 minutes to an hour. A controlled cooling period is desirable following removal of the gaskets from the mold, and the gaskets are preferably supported during this period to prevent distortion.

The sealing performance of gaskets made in accordance with the present invention can be improved by coating the sealing surfaces or preferably all four surfaces of the gasket with a coating such as neoprene. In the sectional view of FIG. 12a, all four external surfaces of the illustrated gasket are provided with a neoprene coating 61. The dimensional stability as well as the sealing characteristics of the gasket are improved by such a coating. In FIG. 12a, a pair of opposed parallel clamping surfaces 132a and 132b are schematically shown adjacent the gasket sealing surfaces, the arrows indicating the direction of the clamping force which would be applied to effect a compression of the gasket and a sealing of the space between the clamping surfaces.

I claim:

1. A laminated circumferentially extending gasket for sealing the space between opposed substantially parallel clamping surfaces to prevent fluid passage therethrough, comprising a compressible body having inner and outer resilient portions, said resilient portions each being formed of a cork composition and having a substantially rectangular cross-section, a reinforcing and sealing element of aluminum foil adhesively bonded between said resilient portions, said foil having a thickness of less than about .004″, said resilient portions and the edges of said foil element cooperating to form opposed substantially parallel sealing surfaces adapted for engagement by the opposed clamping surfaces, said foil element being continuous throughout the circumference of said gasket and being substantially perpendicular to said parallel sealing surfaces, and a fluid impervious coating on each of said sealing surfaces, the clamping of said gasket between the opposed clamping surfaces causing a compression of said body resilient portions and a permanent deformation of said foil element in a folded accordian fashion, said foil element adapting to the compressed condition of said body resilient portions with the foil element edges remaining at said sealing surfaces in continuous circumferential engagement with said coatings whereby said foil element and said coatings prevent fluid passage between the clamping surfaces.

2. A gasket as claimed in claim 1, including a plurality of bolt holes in said outer resilient portion extending between said sealing surfaces, said bolt holes being spaced outwardly from said foil element.

References Cited

UNITED STATES PATENTS

| | | | |
|---|---|---|---|
| 1,676,432 | 7/1928 | Dieterich | 277—233 |
| 2,814,517 | 11/1957 | Razdow | 277—229 X |
| 1,635,482 | 7/1927 | Joyce | 277—228 |

FOREIGN PATENTS 322,903  12/1929  Great Britain.

LAVERNE D. GEIGER, Primary Examiner

JEFFREY S. MEDNICK, Assistant Examiner

U.S. Cl. X.R.

277—237